United States Patent
Mock

[11] 3,903,929
[45] Sept. 9, 1975

[54] IRRIGATION CONDUIT
[75] Inventor: Donald E. Mock, Covina, Calif.
[73] Assignee: Anjac Plastics, Inc., El Monte, Calif.
[22] Filed: Nov. 10, 1971
[21] Appl. No.: 197,242

[52] U.S. Cl. .................. 138/115; 138/178; 61/11; 239/145
[51] Int. Cl.² ...................................... F16L 11/012
[58] Field of Search ........ 61/11; 138/113, 115, 178; 239/145, 208, 542, 548, 553, 553.3, 553.6

[56] References Cited
UNITED STATES PATENTS

| 987,398 | 3/1911 | Potter | 138/115 |
|---|---|---|---|
| 2,749,180 | 6/1956 | Andrews | 239/208 X |
| 3,361,359 | 1/1968 | Chapin | 239/145 |
| 3,672,571 | 6/1972 | Goodricke | 239/145 |

FOREIGN PATENTS OR APPLICATIONS

| 729,659 | 5/1955 | United Kingdom | 138/115 |
|---|---|---|---|

*Primary Examiner*—Herbert F. Ross
*Attorney, Agent, or Firm*—Edward D. O'Brian

[57] ABSTRACT

An irrigation conduit may be formed by extruding a flexible, imporous polymer in the form of a structure having first and second integral tubes connected by a common wall separating their interiors. A first series of holes extends through the common wall so as to connect the interiors of the tubes. A second series of holes connects the interior of the second tube with the exterior of the conduit. When water under pressure is supplied to the interior of the first tube, it is distributed to the interior of the second tube with a drop in the pressure. Water reaching the interior of the second tube is then distributed to the exterior of the conduit through the holes of the second series.

4 Claims, 5 Drawing Figures

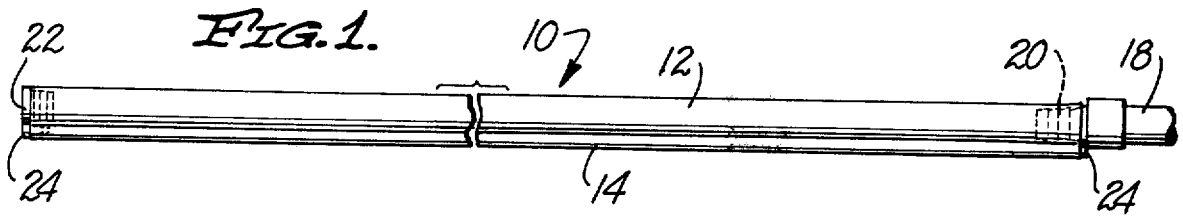
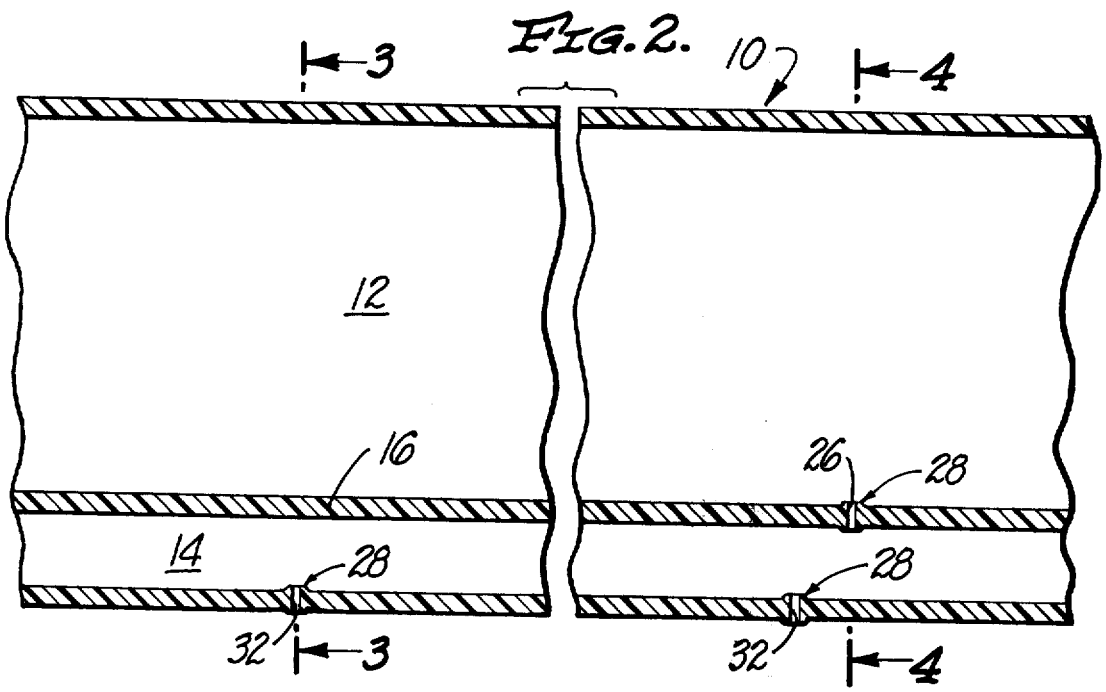
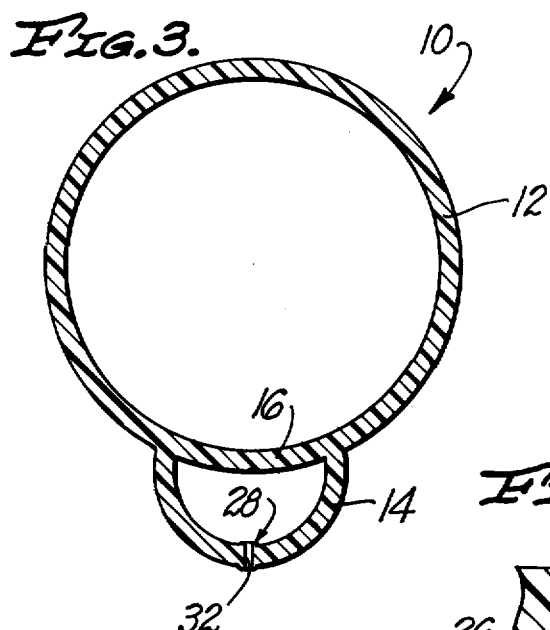
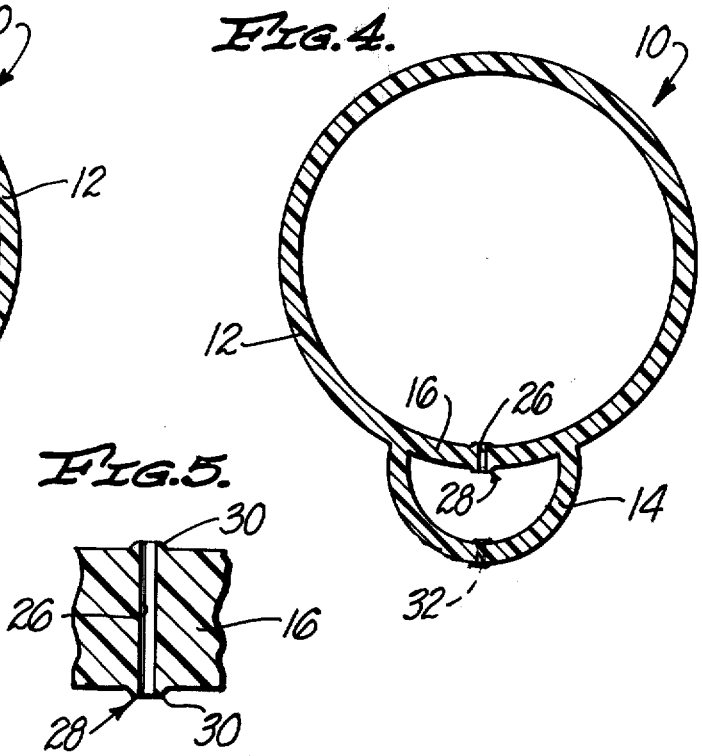

IRRIGATION CONDUIT

BACKGROUND OF THE INVENTION

"Irrigation" is defined as "the artificial application of water to land to assist in the production of crops", (*Random House Unabridged Dictionary of the English Language*, Copyright 1966, page 754). Various different structures and methods have been used in irrigating crops since virtually the beginning of recorded history. In spite of the fact that the field of irrigation is one having a very ancient and prominent place in history, it is considered that there is a continuing need for new and improved procedures to be utilized in supplying water to crops.

To a large extent such need is related to a desire to supply water to crops in locations where it is needed and at time intervals corresponding to when water is most needed by plants. To a large extent such need is also related to economic considerations. Such considerations are considered to dictate that any irrigation procedure utilized fairly inexpensive or nominally priced apparatus. Such economic considerations are also considered to dictate that any irrigation procedure be of such a character that a maximum utilization is achieved from any water utilized.

In a specification of this type it would be impractical to discuss in detail all of the different irrigation procedures which have been known since the beginning of history. In comparatively recent times a great deal of interest has been expressed in irrigation conduit buried beneath the surface of the ground. It is also considered that conduit of this type has not, as a general rule, operated satisfactorily over relatively prolonged periods. It is not considered that an understanding of the present invention requires a detailed consideration as to the relative merits and virtues of prior conduit that has been utilized in irrigation. The important thing to know is that there appears to be a continuing need for improvement of such conduit.

SUMMARY OF THE INVENTION

An objective of the present invention is to provide new and improved irrigation conduit. More specifically an objective of the present invention is to provide irrigation conduit: which may be easily and conveniently produced at a comparatively nominal cost; which may be easily installed with a minimum of difficulty in a location where it is to be used; which may be easily and conveniently employed for irrigation purposes; which is capable of giving prolonged, effective reliable service in irrigating plants or crops; and which can be utilized in such a manner as to obtain effective water utilization.

In accordance with this invention these and various other related objectives of the invention as will be apparent from a detailed consideration of this entire specification are achieved by forming an extruded, flexible, imporous thermoplastic irrigation conduit having a uniform cross-sectional configuration along its length. This conduit has first and second integral tubes connected by a common wall belonging to both of the tubes; it also includes a first series of holes extending through the common wall and a second series of holes leading from the interior or the second tube to the exterior of the conduit.

BRIEF DESCRIPTION OF THE DRAWING

This structure is intended to be utilized in conveying and distributing irrigation water under pressure from a conventional conduit or source of such water as indicated in subsequent portions of this specification and as illustrated in the accompanying drawing in which:

FIG. 1 is a side elevational view of a length of a presently preferred irrigation conduit in accordance with this invention, this view indicating in a diagrammatic manner the utilization of this conduit;

FIG. 2 is a partial cross-sectional view of a length of conduit as shown in FIG. 1;

FIG. 3 is a cross-sectional view taken at line 3—3 of FIG. 2;

FIG. 4 is a cross-sectional view taken at line 4—4 of FIG. 2; and

FIG. 5 is an enlarged detailed view showing a hole as shown in cross-section in preceding figures.

From a consideration of the remainder of this specification and of the drawing it will be realized that the illustrated irrigation conduit is not the present invention itself, but is a specific structure embodying the essential features or concepts of the present invention. Such features or concepts are defined or summarized in the appended claims. They may be utilized within a number of structures which may differ significantly in appearance from one another.

DETAILED DESCRIPTION OF THE PREFERRED EMBODIMENT:

In various figures in the drawing there is shown an irrigation conduit 10 of the present invention formed of a flexible, imporous organic polymer such as plasticized polyvinyl chloride, a common polyethylene or the like as an integral unit consisting of a length of material. Such a length may be conveniently formed at a nominal cost by known extrusion techniques so as to include a first tube 12 and a second tube 14 located at one side of the first tube 12 so that these tubes have a common wall 16 separating them. In the preferred embodiment of the structure the second tube 14 is of smaller cross-sectional area that the first tube 12 in order to save material since this second tube 14 in effects acts as a distribution manifold or conduit.

During normal use of the conduit 10 the interior of the first tube 12 is connected to a pipe 18 or the like used to convey water under pressure through the use of a simple, conventional "slip-on" type of coupling nipple 20. The end of the first tube 12 remote from this pipe 18 is preferably closed by a conventional internal plug 22, although if desired it may be connected to another conduit of any desired type so that the entire conduit 10 serves essentially as a pipe to convey water at the same time that it is being employed for irrigation purposes. During the use of the conduit 10 the ends of the second tube 14 are preferably, but not necessarily also closed by plugs 24 having an external configuration corresponding to and slightly larger than the internal configuration of the second tube 14. The tubes 12 and 14 may be sealed shut by the application of heat and pressure or may be otherwise closed to avoid the use of the plugs 22 and 24. Normally this is not preferred for essentially convenience type reasons.

As the conduit 10 is utilized water under pressure will be supplied to the first tube 12 from the pipe 18. This will, of course, tend to fill the first tube 12 as air is displaced from it. It is considered immaterial if a small quantity of air is trapped in the first tube 12 adjacent to the plug 22. Because of its circular cross-sectional configuration and seamless character the first tube 12 is capable of withstanding what is considered to be a maximum amount of pressure per unit or quantity of material utilized in creating this first tube. This is considered to be significant in achieving an economy of manufacture.

In addition, if the pressure of the fluid supplied is sufficiently great—so long that such pressure is not extremely large—such pressure will not normally rupture the first tube 12, but will tend to stretch it so as to a degree tend to produce a cross orientation in a different direction than any orientation which may have resulted from the extrusion of the conduit 10. This is considered to be beneficial in holding down material cost and in providing a conduit which can take or withstand comparatively high pressure without rupture. The tube 12 can, of course, be ruptured if the pressure supplied to it is excessive.

An important feature of the conduit 10 is the use of holes 26 of a first series of holes in the wall 16 to create a pressure drop in allowing water to be distributed from the first tube 12 to the second tube 14. These holes 26 are preferably spaced from one another at periodic intervals such as one every 12 feet and are preferably of a uniform dimension. Satisfactory results can be achieved if the holes 26 are about 0.20 in. in diameter. In general these holes 26 should be small enough in area to create a significant pressure drop. The spacing of the holes 26 is not critical and may be varied as desired so long as sufficient holes 26 are used so as to easily fill the second tube 14. Similarly the areas of the holes 26 may be varied.

It is considered important that each hole 25 be defined by or surrounded by a continuous, smooth curved wall in order to avoid the presence of small fragments of material which might engage and hold sediment particles so as to tend to block fluid flow. Preferably but not necessarily each of the holes 26 is surrounded by a small hub 28 of the material used in forming the conduit 10. Each such hub 28 includes a small boss 30 at each end of a hole 26 so that each of the hubs 28 is thicker than the wall upon which it is located. These hubs 28 are advantageous in reinforcing the wall 16 around the holes 26 so as to minimize wear tending to enlarge the holes 26 and so as to minimize material flexure around the holes 26. It is considered that such flexure could ultimately tend to result in an increase or change in the effective diameter of a hole 26.

It is considered that it is important that the cross-sectional areas of all of the holes 26 are maintained uniform so that as the conduit 10 is used with water pressure of a give value there will always be a constant pressure drop as the water flows between the first and second tubes 12 and 14. As a result of such flow water is of course conveyed to the second tube 14. From here it is distributed to the ambient area through the use of holes 32 of a second series of holes. These holes 32 are located in the wall of the second tube 14 so as to lead from the interior of the second tube 14 to the exterior of the conduit 10; except as herein indicated they are of the same character as the holes 26.

Preferably there are a greater number of the holes 32 than there are of the holes 26 and the holes 32 are equally spaced at intervals such as one every 3 feet.

When this is the case, the total area of the holes 32 of the second series will be greater than the total area of the holes 26 of the first series so that water can escape more easily from the interior of the second tube 14 to the ambient area than it can escape from the interior of the first tube 12 to the interior of the second tube 14. This serves to in effect create three different pressure "states" as the conduit 10 is used.

The first and highest of the group is the pressure within the first tube 12. The second intermediate pressure is maintained within the second tube 14 while on the exterior of the conduit 10 there is lower ambient pressure into which water may readily and freely escape. The greater the number of the holes 32 of the second series the more uniform the distribution of water achieved along the length of the conduit 10. Preferably the holes 32 are offset from the holes 26 a small amount insufficient to interfere with the creation of the holes 26 by the application of heat through holes 32.

Such an offset is desired in order to prevent the holes 26 from acting more or less like nozzles so as to direct fluid towards the holes 32. In effect the offset serves to aid in the maintenance of the pressure in the tube 14 at an intermediate level. All of these holes 26 and 32 can be created by appropriate application of heat. When there is such correspondence the total number of the holes 32 is a multiple of the total number of the holes 26. Preferably each of the holes 32 is of the same or slightly greater diameter than each of the holes 26. This is to facilitate manufacturing. Further, the holes 32 preferably include bosses 30 forming part of hubs 28 such as are used in connection with the holes 26. These hubs 28 are used with the holes 32 for the same reason that they are used with the holes 26.

It is possible to utilize the conduit 10 so that it is normally exposed to ambient air. It is considered preferable, however, to utilize this conduit 10 so that it is buried under the surface of the ground to a depth roughly corresponding or approximating the depth expected for the principal root growth of plants to be watered utilizing the conduit 10. The conduit 10 may be easily installed under the surface of the ground by dropping it in a ditch or unreeling it into the furrow behind a plow or similar structure being moved over a field. One significant advantage of the present invention which might not normally be expected is the fact that the conduit 10 frequently or normally can be easily and cheaply pulled out of a field by pulling on one of its ends at the end of a growing season so that the field may be recultivated for use without danger of damaging the conduit 10.

Frequently in manufacturing the conduit 10 it may be convenient to manufacture it so that the first tube 12 is of other than the precise shape or configuration illustrated. Thus, for example this first tube 12 can be extruded so as to have an oval or flat-like shape to facilitate its being wound upon a spool or the like. Similar changes to facilitate storage and handling may be made in the initial shape of the second tube 14. When a tube such as the first tube 12 is formed in this manner, it will normally assume a circular cross-sectional configuration as significant pressure is applied to its interior. Similarly an initially flattened second tube 14 will normally "round out" as the complete structure is used so that the pressure within the secondary tube 14 is increased provided the pressures involved are adequate to cause deformation of the material present.

At times for manufacturing convenience it may be desirable to have the holes 32 of smaller cross-sectional area than the holes 26. In certain applications this may be desirable as where it is desired or intended to utilize the dimensions of the holes used to obtain a precise pressure drop or series of pressure drops. It is possible to regulate the pressure drop in accordance with the invention by varying the cross-sectional areas of the holes 26 and 32 so as to compensate for any pressure drop in liquid being conveyed along the length of the complete conduit 10.

In order to obtain such compensation holes such as the holes 26 furtherest removed from a source of water under pressure should be of a gradually increasing size so as to increase in area in accordance with distance away from the water source. To achieve even further control of pressure situation it is possible to periodically seal or close off the interior of the second tube 14 as by sealing this second tube 14 against the exterior of the first tube 12. This will achieve a degree of regulation of flow in the second tube 14 preventing this second tube from serving as a conduit along the length of the complete conduit 10.

I claim:

1. An irrigation conduit which comprises:
   first and second seamless, integral tubes of a flexible imporous, polymer material,
   said first tube having a circular cross-sectional configuration when subjected to water pressure,
   said tubes having a uniform cross-sectional configuration along their length,
   said tubes having a common wall separating their interiors serving as a wall for both of their interiors,
   said second tube having a non-circular cross-sectional configuration and including a wall extending outwardly from said first tube which is attached to said first tube at the opposed edges of said common wall,
   a first series of holes of uniform diameter uniformly spaced from one another in said common wall placing the interiors of said tubes in communication with one another.
   a second series of holes of uniform diameter uniformly spaced from one another in said second tube leading from the interior of said second tube to the exterior of said conduit,
   said first tube being capable of receiving water under pressure and distributing it to the interior of the second tube through said holes of said first series,
   said holes of said first series being sufficiently small so as to cause a pressure drop as water is distributed from the interior of said first tube to the interior of said second tube,
   said holes in said second tube being capable of distributing water from the interior of said second tube to the exterior of said conduit,
   the totle area of said holes of said second series being greater than the total area of said holes of said first series so that water can escape more easily from the interior of said second tube to the exterior of said conduit than water can flow from the interior of said first tube to the interior of said second tube.

2. An irrigation conduit as claimed in claim 1 wherein:
   all of said holes in both of said series are of the same diameter and,
   there are more of said holes of said second series than there are of said holes of said first series.

3. An irrigation conduit as claimed in claim 1 wherein:
   all of said holes in both of said series are of the same diameter and have continuous, smooth curved walls, and
   there are more of said holes of said second series than there are of said holes of said first series,
   the holes of said second series are offset from the holes of said first series.

4. An irrigation conduit as claimed in claim 1 wherein:
   the holes of said second series are offset from the holes of said first series.

* * * * *